US011965067B2

(12) United States Patent
Barretto

(10) Patent No.: US 11,965,067 B2
(45) Date of Patent: Apr. 23, 2024

(54) PROCESS FOR FORMING A LAMINATE

(71) Applicant: Dow Global Technologies LLC, Midland, MI (US)

(72) Inventor: Abraham Barretto, Mumbai (IN)

(73) Assignee: Dow Global Technologies LLC, Midland, MI (US)

( * ) Notice: Subject to any disclaimer, the term of this patent is extended or adjusted under 35 U.S.C. 154(b) by 384 days.

(21) Appl. No.: 17/280,286

(22) PCT Filed: Sep. 20, 2019

(86) PCT No.: PCT/US2019/052166
§ 371 (c)(1),
(2) Date: Mar. 26, 2021

(87) PCT Pub. No.: WO2020/068584
PCT Pub. Date: Apr. 2, 2020

(65) Prior Publication Data
US 2022/0002506 A1    Jan. 6, 2022

(30) Foreign Application Priority Data

Sep. 28, 2018 (IN) .............................. 201841036784

(51) Int. Cl.
| | |
|---|---|
| B32B 7/12 | (2006.01) |
| B32B 27/08 | (2006.01) |
| B32B 27/32 | (2006.01) |
| B32B 37/02 | (2006.01) |
| B32B 37/12 | (2006.01) |
| B32B 37/20 | (2006.01) |
| C08G 18/12 | (2006.01) |
| C08G 18/40 | (2006.01) |
| C08G 18/42 | (2006.01) |
| C08G 18/48 | (2006.01) |
| C08G 18/76 | (2006.01) |
| C08J 5/12 | (2006.01) |
| C08J 5/18 | (2006.01) |
| C09J 5/00 | (2006.01) |
| C09J 175/08 | (2006.01) |

(52) U.S. Cl.
CPC ................ *C08J 5/128* (2013.01); *B32B 7/12* (2013.01); *B32B 27/08* (2013.01); *B32B 27/32* (2013.01); *B32B 37/02* (2013.01); *B32B 37/12* (2013.01); *B32B 37/203* (2013.01); *C08G 18/12* (2013.01); *C08G 18/4018* (2013.01); *C08G 18/425* (2013.01); *C08G 18/4829* (2013.01); *C08G 18/76* (2013.01); *C08J 5/18* (2013.01); *C09J 5/00* (2013.01); *C09J 175/08* (2013.01); *B32B 2250/05* (2013.01); *B32B 2250/242* (2013.01); *B32B 2307/409* (2013.01); *B32B 2307/518* (2013.01); *B32B 2307/582* (2013.01); *B32B 2309/02* (2013.01); *B32B 2309/105* (2013.01); *B32B 2323/10* (2013.01); *B32B 2419/00* (2013.01); *B32B 2425/00* (2013.01); *B32B 2607/00* (2013.01); *C08J 2323/12* (2013.01); *C08J 2475/08* (2013.01); *C09J 2423/108* (2013.01); *C09J 2475/00* (2013.01)

(58) Field of Classification Search
CPC .... C08J 5/128; C08J 2323/12; C08J 2475/08; C08J 2423/108; C08J 2475/00; B32B 7/12; B32B 27/08; B32B 27/32; B32B 2250/05; B32B 2250/242; B32B 2307/409; B32B 2307/518; B32B 2307/582; B32B 2419/00; B32B 2425/00; B32B 2607/00; C08G 18/12; C08G 18/4018; C08G 18/425; C08G 18/4829; C08G 18/76; C09J 5/00; C09J 175/08
See application file for complete search history.

(56) References Cited

U.S. PATENT DOCUMENTS 6,833,044 B2 * 12/2004 Imai ..................... C08G 18/664
                                                        156/331.7
7,854,987 B2    12/2010 Jaipuria
7,942,181 B2     5/2011 Cerciello
(Continued)

FOREIGN PATENT DOCUMENTS

| AU | 9471631 A   * 11/1994 ............... G09F 3/02 |
|----|---|
| AU | 665315 B2   12/1995 |

(Continued)

OTHER PUBLICATIONS

[NPL-1] Wang (CN 104228213 A); Dec. 2014 (EPO machine translation to English). (Year: 2014).*

*Primary Examiner* — David Sample
*Assistant Examiner* — Donald M Flores, Jr.
(74) *Attorney, Agent, or Firm* — Boyle Fredrickson, S.C.

(57) ABSTRACT

The present disclosure provides a process. The process includes (A) providing at least 6 film layers, each film layer being a pearlized biaxially oriented polypropylene; (B) applying a solvent-less adhesive at a coat weight of 2.0 g/m² to 3.5 g/m² between each film layer; and (C) forming a laminate, the laminate having a thickness of at least 300 μm. The solvent-less adhesive contains (i) a polyol component including at least one polyol selected from a polyester polyol, a polyether polyol, and combinations thereof; and (ii) an isocyanate component including an isocyanate prepolymer that is the reaction product of at least one isocyanate monomer and at least one polyol selected from a polyester polyol, a polyether polyol, and combinations thereof. The present disclosure also provides a laminate formed by said process.

18 Claims, No Drawings

(56) References Cited

U.S. PATENT DOCUMENTS

| | | |
|---|---|---|
| 8,377,508 B2 | 2/2013 | Uemura et al. |
| 2014/0370252 A1 | 12/2014 | Regnier |
| 2017/0321095 A1* | 11/2017 | Pela ........................ C09J 175/04 |
| 2017/0369625 A1 | 12/2017 | Casarrubias et al. |

FOREIGN PATENT DOCUMENTS

| | | | |
|---|---|---|---|
| CN | 104228213 A * | 12/2014 | |
| WO | 9000788 A1 | 1/1990 | |
| WO | WO-2016100052 A1 * | 6/2016 | ............. C08G 18/10 |
| WO | 2018049672 A1 | 3/2018 | |

* cited by examiner

PROCESS FOR FORMING A LAMINATE

BACKGROUND

Biaxially oriented polypropylene (BOPP) film layers are used in laminates for applications such as billboards, wall panels, restaurant menu cards, and business visiting cards. The laminates are traditionally formed with solvent-based adhesives that require an additional drying step to remove the solvent and form an adhesive layer. The drying step is traditionally accomplished by passing the BOPP film layers and solvent-based adhesive through an oven at an elevated temperature, which requires additional equipment and processing costs. Because the solvent-based adhesive requires time to dry (and cure and develop bonds), it does not provide sufficient adhesion between BOPP film layers within minutes or a few hours after application. Insufficient adhesion shortly after application of the solvent-based adhesive can result in defects in the laminate structure, such as telescoping, tunneling, and air gaps.

The art recognizes the need for a process for producing laminates containing BOPP film layers with a solvent-less adhesive.

SUMMARY

The present disclosure provides a process. The process includes (A) providing at least 6 film layers, each film layer being a pearlized biaxially oriented polypropylene (BOPP); (B) applying a solvent-less adhesive at a coat weight from 2.0 g/m² to 3.5 g/m² between each film layer; and (C) forming a laminate, the laminate having a thickness of at least 300 µm. The solvent-less adhesive contains (i) a polyol component including at least one polyol selected from a polyester polyol, a polyether polyol, and combinations thereof; and (ii) an isocyanate component including an isocyanate prepolymer that is the reaction product of at least one isocyanate monomer and at least one polyol selected from a polyester polyol, a polyether polyol, and combinations thereof.

The present disclosure also provides a laminate. The laminate includes at least 6 film layers, each film layer being a pearlized biaxially oriented polypropylene (BOPP); and an adhesive layer between each film layer. Each adhesive layer is formed from a solvent-less adhesive containing (i) a polyol component including at least one polyol selected from a polyester polyol, a polyether polyol, and combinations thereof; and (ii) an isocyanate component including an isocyanate prepolymer that is the reaction product of at least one isocyanate monomer and at least one polyol selected from a polyester polyol, a polyether polyol, and combinations thereof. The laminate has a thickness of at least 300 µm.

Definitions

Any reference to the Periodic Table of Elements is that as published by CRC Press, Inc., 1990-1991. Reference to a group of elements in this table is by the new notation for numbering groups.

For purposes of United States patent practice, the contents of any referenced patent, patent application or publication are incorporated by reference in their entirety (or its equivalent US version is so incorporated by reference) especially with respect to the disclosure of definitions (to the extent not inconsistent with any definitions specifically provided in this disclosure) and general knowledge in the art.

The numerical ranges disclosed herein include all values from, and including, the lower and upper value. For ranges containing explicit values (e.g., a range from 1, or 2, or 3 to 5, or 6, or 7), any subrange between any two explicit values is included (e.g., the range 1-7 above includes subranges 1 to 2; 2 to 6; 5 to 7; 3 to 7; 5 to 6; etc.).

Unless stated to the contrary, implicit from the context, or customary in the art, all parts and percents are based on weight and all test methods are current as of the filing date of this disclosure.

The term "composition" refers to a mixture of materials which comprise the composition, as well as reaction products and decomposition products formed from the materials of the composition.

The terms "comprising," "including," "having," and their derivatives, are not intended to exclude the presence of any additional component, step or procedure, whether or not the same is specifically disclosed. In order to avoid any doubt, all compositions claimed through use of the term "comprising" may include any additional additive, adjuvant, or compound, whether polymeric or otherwise, unless stated to the contrary. In contrast, the term "consisting essentially of" excludes from the scope of any succeeding recitation any other component, step, or procedure, excepting those that are not essential to operability. The term "consisting of" excludes any component, step, or procedure not specifically delineated or listed. The term "or," unless stated otherwise, refers to the listed members individually as well as in any combination. Use of the singular includes use of the plural and vice versa.

An "isocyanate" is a chemical that contains at least one isocyanate group in its structure. An isocyanate group is represented by the formula: —N═C═O. An isocyanate that contains more than one, or at least two, isocyanate groups is a "polyisocyanate." An isocyanate that has two isocyanate groups is a di-isocyanate and an isocyanate that has three isocyanate groups is a tri-isocyanate, etc. An isocyanate may be aromatic or aliphatic.

A "polyether" is a compound containing two or more ether linkages in the same linear chain of atoms.

A "polyester" is a compound containing two or more ester linkages in the same linear chain of atoms.

A "polymer" is a polymeric compound prepared by polymerizing monomers, whether of the same or a different type. The generic term polymer thus embraces the term "homopolymer" (employed to refer to polymers prepared from only one type of monomer, with the understanding that trace amounts of impurities can be incorporated into the polymer structure), and the term "interpolymer," which includes copolymers (employed to refer to polymers prepared from two different types of monomers), terpolymers (employed to refer to polymers prepared from three different types of monomers), and polymers prepared from more than three different types of monomers. Trace amounts of impurities, for example, catalyst residues, may be incorporated into and/or within the polymer. It also embraces all forms of copolymer, e.g., random, block, etc. It is noted that although a polymer is often referred to as being "made of" one or more specified monomers, "based on" a specified monomer or monomer type, "containing" a specified monomer content, or the like, in this context the term "monomer" is understood to be referring to the polymerized remnant of the specified monomer and not to the unpolymerized species. In general, polymers herein are referred to has being based on "units" that are the polymerized form of a corresponding monomer.

A "polyol" is an organic compound containing multiple hydroxyl (—OH) groups. In other words, a polyol contains at least two hydroxyl groups. Nonlimiting examples suitable polyols include diols (which contain two hydroxyl groups) and triols (which contain three hydroxyl groups).

A "propylene-based polymer" is a polymer that contains more than 50 weight percent polymerized propylene monomer (based on the total amount of polymerizable monomers) and, optionally, may contain at least one comonomer. Propylene-based polymer includes propylene homopolymer, and propylene copolymer (meaning units derived from propylene and one or more comonomers). The terms "propylene-based polymer" and "polypropylene" are used interchangeably.

Test Methods

Hydroxyl group functionality is the number of hydroxyl groups (—OH groups) present in a compound. Hydroxyl group functionality is measured in accordance with ASTM D4274-16.

Isocyanate group (NCO) content by weight is measured in accordance with ASTM D2572-97.

The peel test is performed in accordance with ASTM D1876.

Viscosity of the isocyanate prepolymer is measured at 25° C. in accordance with ASTM D2196, and is reported in centipoise (cP).

Bond Strength

Bond strength is measured 24 hours after the solvent-less adhesive is applied between the film layers. In other words, the laminate is cured at room temperature (23° C.) for a period of 24 hours. Bond strength is measured in accordance with ASTM F904-16.

Gel Permeation Chromatography (GPC)

A high temperature gel permeation chromatography (GPC) system, equipped with Robotic Assistant Deliver (RAD) system is used for sample preparation and sample injection. The concentration detector is an Infra-red detector (IR-5) from Polymer Char Inc. (Valencia, Spain). Data collection is performed using a Polymer Char DM 100 Data acquisition box. The carrier solvent is 1,2,4-trichlorobenzene (TCB). The system is equipped with an on-line solvent degas device from Agilent. The column compartment is operated at 150° C. The columns are four Mixed A LS 30 cm, 20 micron columns. The solvent is nitrogen-purged 1,2,4-trichlorobenzene (TCB) containing approximately 200 ppm 2,6-di-t-butyl-4-methylphenol (BHT). The flow rate is 1.0 mL/min, and the injection volume is 200 μL. A "2 mg/mL" sample concentration is prepared by dissolving the sample in $N_2$ purged and preheated TCB (containing 200 ppm BHT), for 2.5 hours at 160° C., with gentle agitation.

The GPC column set is calibrated by running twenty narrow molecular weight distribution polystyrene standards. The molecular weight (MW) of the standards ranges from 580 g/mol to 8,400,000 g/mol, and the standards are contained in six "cocktail" mixtures. Each standard mixture has at least a decade of separation between individual molecular weights. The equivalent polypropylene molecular weights of each PS standard are calculated by using following equation, with reported Mark-Houwink coefficients for polypropylene (Th. G. Scholte, N. L. J. Meijerink, H. M. Schoffeleers, & A. M. G. Brands, J. Appl. Polym. Sci., 29, 3763-3782 (1984)) and polystyrene (E. P. Otocka, R. J. Roe, N.Y. Hellman, & P. M. Muglia, Macromolecules, 4, 507 (1971)):

$$M_{PP} = \left(\frac{K_{PS} M_{PS}^{a_{PS}+1}}{K_{PP}}\right)^{\frac{1}{a_{PP}+1}}, \quad (Eq\ 1)$$

where $M_{PP}$ is PP equivalent MW, $M_{PS}$ is PS equivalent MW, log K and a values of Mark-Houwink coefficients for PP and PS are listed below.

| Polymer | a | log K |
|---|---|---|
| Polypropylene | 0.725 | −3.721 |
| Polystyrene | 0.702 | −3.900 |

A logarithmic molecular weight calibration is generated using a fourth order polynomial fit as a function of elution volume. Number average and weight average molecular weights are calculated according to the following equations:

$$M_n = \frac{\Sigma^i W f_i}{\Sigma^i (W f_i / M_i)} \quad M_w = \frac{\Sigma^i (W f_i * M_i)}{\Sigma^i (W f_i)}, \quad (Eq\ 2)$$

(Eq 3), where $Wf_i$ and $M_i$ are the weight fraction and molecular weight of elution component i, respectively.

Tear Force

The "tear force" is the minimum amount of force required to obtain a smooth tear in a laminate, with no rough edges. Tear force is measured in the machine direction (MD) and the transverse direction (TD). During testing the tear is visually inspected to determine whether it is a smooth tear or a rough tear. Tear force is measured in accordance with ASTM D1004-13.

Tear force is measured after lamination, and the laminate is cured at room temperature (23° C.) for a period of 8 hours. The tear force distance is 43 mm.

DETAILED DESCRIPTION

The present disclosure provides a process. The process includes (A) providing at least 6 film layers, each film layer being a pearlized biaxially oriented polypropylene (BOPP); (B) applying a solvent-less adhesive at a coat weight from 2.0 g/m² to 3.5 g/m² between each film layer; and (C) forming a laminate, the laminate having a thickness of at least 300 μm. The solvent-less adhesive contains (i) a polyol component including at least one polyol selected from a polyester polyol, a polyether polyol, and combinations thereof; and (ii) an isocyanate component including an isocyanate prepolymer that is the reaction product of at least one isocyanate monomer and at least one polyol selected from a polyester polyol, a polyether polyol, and combinations thereof.

A. Providing at Least 6 Film Layers

The process includes the step of providing at least 6 film layers. Each film layer is a pearlized biaxially oriented polypropylene (BOPP).

At least 6 film layers are provided. For example, the process can include providing six, seven, eight, nine, ten, eleven, twelve, or more film layers. In an embodiment, from 6, or 7, or 8 to 10, or 11, or 12 film layers are provided. In another embodiment, at least 8 film layers are provided. In another embodiment, only 6 film layers are provided. In another embodiment, only 8 film layers are provided. In another embodiment, only 10 film layers are provided.

Each film layer is a pearlized BOPP. A "pearlized biaxially oriented polypropylene film layer" is a continuous monolayer film formed from a propylene-based polymer (such as a propylene homopolymer) and a filler (such as titanium dioxide), that has been stretched in the machined direction (MD) and the transverse direction (TD). Nonlimiting examples of suitable films include extruded films and cast films.

Each film layer of the pearlized BOPP has two opposing surfaces. Each film layer is a continuous layer with two opposing surfaces. Each surface has a finish. Nonlimiting examples of suitable finishes include glossy, matte, and combinations thereof. In an embodiment, each film layer has a first surface having a glossy finish and a second surface having a matte finish. In an embodiment, a topmost film layer has an outermost surface having a matte finish and an inner surface having a gloss finish, and the surfaces of each inner layer have a gloss finish. The matte finish facilitates printing on the laminate.

Each film layer of the pearlized BOPP has a thickness from 50 μm to 70 μm, or 80 μm. Each film layer may have the same thickness or a different thickness than the other film layers. In an embodiment, each film layer has the same thickness. In another embodiment, each film layer has a thickness independently selected from 50 μm and 70 μm, and the laminate includes at least one film layer having a thickness of 50 μm and at least one film layer having a thickness of 70 μm. In another embodiment, at least one film layer has a thickness of 70 μm.

In an embodiment, each film layer of the pearlized BOPP has a width from 1000 millimeter (mm), or 1200 mm, or 1400 mm, or 1500 mm, or 1600 mm, or 1700 mm to 1800 mm, or 1900 mm, or 2000 mm, or 2100 mm, or 2200 mm, or 2500 mm, or 3000 mm. Each film layer has the same width.

In an embodiment, each film layer of the pearlized BOPP is void of, or substantially void of, ethylene vinyl acetate (EVA) copolymer.

In an embodiment, each film layer of the pearlized BOPP is void of, or substantially void of, polyethyleneterephthalate (PET).

In an embodiment, the process includes providing from 6, or 8 to 12 film layers, each film layer being a pearlized BOPP having one, some, or all of the following properties: (i) a thickness from 50 μm to 70 μm, or 80 μm; and/or (ii) a width from 1000 mm, or 1200 mm, or 1400 mm, or 1500 mm, or 1600 mm, or 1700 mm to 1800 mm, or 1900 mm, or 2000 mm, or 2100 mm, or 2200 mm, or 2500 mm, or 3000 mm; and/or (iii) has two opposing surfaces, each surface having a glossy finish; or a first surface having a matte finish and a second surface having a glossy finish; and/or (iv) is void of EVA copolymer; and/or (v) is void of PET.

Each film layer of the pearlized BOPP may comprise two or more embodiments disclosed herein.

The providing at least 6 film layers of the pearlized BOPP may comprise two or more embodiments disclosed herein.

B. Applying a Solvent-Less Adhesive

The process includes the step of applying a solvent-less adhesive between each film layer. The solvent-less adhesive is applied at a coat weight from 2.0 g/m² to 3.5 g/m². The solvent-less adhesive contains:

(i) a polyol component including at least one polyol selected from a polyester polyol, a polyether polyol, and combinations thereof; and (ii) an isocyanate component including an isocyanate prepolymer that is the reaction product of at least one isocyanate monomer and at least one polyol selected from a polyester polyol, a polyether polyol, and combinations thereof.

A "solvent-less adhesive" is an adhesive composition that is void of, or substantially void of, a solvent.

i. Polyol Component

The solvent-less adhesive contains a polyol component. The polyol component includes at least one polyol selected from a polyester polyol, a polyether polyol, and combinations thereof.

Polyester Polyol

In an embodiment, the polyol includes a polyester polyol.

A "polyester polyol" is a compound that is a polyester and a polyol. Nonlimiting examples of suitable polyester polyols include polycondensates of diols, polyols (e.g., triols, tetraols), dicarboxylic acids, polycarboxylic acids (e.g., tricarboxylic acids, tetracarboxylic acids), hydroxycarboxylic acids, lactones, and combinations thereof. The polyester polyols can also be derived from, instead of the free polycarboxylic acids, the corresponding polycarboxylic anhydrides, or corresponding polycarboxylic esters of lower alcohols.

Nonlimiting examples of suitable diols include ethylene glycol; butylene glycol; diethylene glycol (DEG); triethylene glycol; polyalkylene glycols, such as polyethylene glycol; 1, 2-propanediol; 1, 3-propanediol; 1, 3-butanediol; 1, 4-butanediol; 1, 6-hexanediol; and neopentyl glycol (NPG).

Nonlimiting examples of suitable dicarboxylic acids include aliphatic acids, aromatic acids, and combinations thereof. Nonlimiting examples of suitable aromatic acids include phthalic acid, isophthalic acid, terephthalic acid, and tetrahydrophthalic acid. Nonlimiting examples of suitable of suitable aliphatic acids include hexahydrophthalic acid, cyclohexane dicarboxylic acid, adipic acid, azelaic acid, sebacic acid, glutaric acid, tetrachlorophthalic acid, maleic acid, fumaric acid, itaconic acid, malonic acid, suberic acid, 2-methyl succinic acid, 3, 3-diethyl glutaric acid, 2, 2-dimethyl succinic acid, and trimellitic acid. As used herein, the term "acid" also includes any anhydrides of said acid. Saturated aliphatic and/or aromatic acids are also suitable, such as adipic acid or isophthalic acid.

In an embodiment, monocarboxylic acids, such as benzoic acid and hexane carboxylic acid, are excluded from the solvent-less adhesive.

In an embodiment, the polyester polyol has a molecular weight from 500 g/mol to 2,000 g/mol, or 3,000 g/mol, or 4,000 g/mol. In a further embodiment, the polyester polyol has a molecular weight from 500 g/mol to 2,000 g/mol.

In an embodiment, the polyester polyol has a hydroxyl group functionality from 1.5, or 2.0 to 3.0.

In an embodiment, the polyester polyol has a hydroxyl group functionality from 2.0 to 3.0. To achieve hydroxyl group functionality greater than 2, polyols having a hydroxyl group functionality of 3 (e.g., trimethylolpropane (TMP), glycerol, erythritol, pentaerythritol, trimethylolbenzene, and/or trishydroxyethyl isocyanurate) may be included in the polyester polyol.

In an embodiment, the polyester polyol is the reaction product of adipic acid, TMP, DEG, isophthalic acid, and NPG.

In an embodiment, the polyester polyol is the reaction product of adipic acid, TMP, DEG, isophthalic acid, and NPG, and the polyester polyol has one or both of the following properties: (i) a molecular weight from 500 g/mol to 2,000 g/mol, or 3,000 g/mol, or 4,000 g/mol; and/or (ii) a hydroxyl group functionality from 1.5, or 2.0 to 3.0.

The polyester polyol may comprise two or more embodiments disclosed herein.

Polyether Polyol

In an embodiment, the polyol includes a polyether polyol.

A "polyether polyol" is a compound that is a polyether and a polyol. Nonlimiting examples of suitable polyether polyols include polyaddition products of ethylene oxide, propylene oxide, tetrahydrofuran, butylene oxide, and the co-addition and grafted products thereof; the polyether polyols obtained by condensation of polyhydric alcohols, or mixtures thereof; and combination thereof.

Nonlimiting examples of suitable polyether polyols include polypropylene glycol (PPG), polyethylene glycol (PEG), polybutylene glycol, polytetramethylene ether glycol (PTMEG), and combinations thereof.

In an embodiment, the polyether polyol has a molecular weight from 50 g/mol, or 100 g/mol to 1,000 g/mol, or 2,000 g/mol, or 3,000 g/mol, or 4,000 g/mol, or 5,000 g/mol. In another embodiment, the polyether polyol has a molecular weight from 50 g/mol to 1,000 g/mol.

In an embodiment, the polyether polyol has a hydroxyl group functionality from 1.5, or 2.0 to 3.0. In another embodiment, the polyether polyol has a hydroxyl group functionality from 2.0 to 3.0.

In an embodiment, the polyether polyol has (i) a molecular weight from 50 g/mol, or 100 g/mol to 1,000 g/mol, or 2,000 g/mol, or 3,000 g/mol, or 4,000 g/mol, or 5,000 g/mol; and (ii) a hydroxyl group functionality from 1.5, or 2.0 to 3.0.

The polyether polyol may comprise two or more embodiments disclosed herein.

In an embodiment, the polyol component contains from 0.05 wt %, or 5 wt %, or 10 wt %, or 20 wt %, or 30 wt % to 40 wt %, or 50 wt %, or 60 wt %, or 70 wt %, or 80 wt %, or 90 wt %, or 100 wt % polyester polyol, based on the total weight of the polyol component. In another embodiment, the polyol component includes from 0.05 wt % to 100 wt %, or from 5 wt % to 90 wt %, or from 10 wt % to 50 wt %, or from 10 wt % to 40 wt % polyester polyol, based on the total weight of the polyol component.

In an embodiment, the polyol component contains from 0.05 wt %, or 5 wt %, or 10 wt %, or 20 wt %, or 30 wt %, or 40 wt %, or 50 wt %, or 60 wt % to 70 wt %, or 80 wt %, or 90 wt %, or 100 wt % polyether polyol, based on the total weight of the polyol component. In another embodiment, the polyol component contains from 0.05 wt % to 100 wt %, or from 5 wt % to 90 wt %, or from 20 wt % to 90 wt %, or from 50 wt % to 80 wt % polyether polyol, based on the total weight of the polyol component.

In an embodiment, the polyol component contains, consists essentially of, or consists of:
(i) from 0.05 wt %, or 5 wt %, or 10 wt %, or 20 wt %, or 30 wt % to 40 wt %, or 50 wt %, or 60 wt %, or 70 wt %, or 80 wt %, or 90 wt %, or 100 wt % polyester polyol; and
(ii) from 0.05 wt %, or 5 wt %, or 10 wt %, or 20 wt %, or 30 wt %, or 40 wt %, or 50 wt %, or 60 wt % to 70 wt %, or 80 wt %, or 90 wt %, or 100 wt % polyether polyol.

In an embodiment, the polyol component contains, consists essentially of, or consists of:
(i) from 50 wt % to 80 wt % polyether polyol having a hydroxyl group functionality from 2 to 3 and a molecular weight from 2 g/mol to 1,000 g/mol; and
(ii) from 10 wt % to 40 wt % polyester polyol that is the reaction product of adipic acid, TMP, DEG, isophthalic acid, and NPG, the polyester polyol having a hydroxyl group functionality of from 2 to 3 and a molecular weight from 500 g/mol to 2,000 g/mol.

It is understood that the sum of the components in each of the components, compositions, and layers disclosed herein, including the foregoing polyol component, yields 100 weight percent (wt %), based on the total weight of the respective component, composition, or layer.

A nonlimiting example of a suitable polyol component is the polyol component disclosed in International Publication No. WO 2018/049672, the entire contents of which are incorporated herein.

The polyol component may comprise two or more embodiments disclosed herein.

ii. Isocyanate Component

The solvent-less adhesive contains an isocyanate component. The isocyanate component includes an isocyanate prepolymer.

An "isocyanate prepolymer" is the reaction product of an isocyanate monomer and at least one polyol. An isocyanate prepolymer is a liquid intermediate between monomers and a final polymer.

Isocyanate Monomer

The isocyanate prepolymer is the reaction product of an isocyanate monomer and at least one polyol.

An "isocyanate monomer" is a molecule that contains at least two isocyanate groups. The isocyanate monomer may chemically bind to a polyol to form a prepolymer. Nonlimiting examples of suitable isocyanate monomers include aromatic isocyanates, aliphatic isocyanates, carbodiimide modified isocyanate monomers, and the combinations thereof.

An "aromatic isocyanate monomer" is an isocyanate monomer containing one or more aromatic rings. Nonlimiting examples of suitable aromatic isocyanate monomers include isomers of methylene diphenyl dipolyisocyanate (MDI) such as 4, 4-MDI, 2, 4-MDI and 2, 2'-MDI; or modified MDI such as carbodiimide modified MDI or allophanate modified MDI; isomers of toluene-dipolyisocyanate (TDI) such as 2, 4-TDI, 2, 6-TDI; isomers of naphthalene-dipolyisocyanate (NDI) such as 1, 5-NDI; and combinations thereof.

An "aliphatic isocyanate monomer" is an isocyanate monomer that is void of, or contains no, aromatic rings. Nonlimiting examples of suitable aliphatic isocyanate monomers include isomers of hexamethylene dipolyisocyanate (HDI), isomers of isophorone dipolyisocyanate (IPDI), isomers of xylene dipolyisocyanate (XDI), and combinations thereof.

In an embodiment, the isocyanate monomer is selected from a mono-isocyanate monomer, a di-isocyanate monomer, a tri-isocyanate monomer, and combinations thereof. In a further embodiment, the isocyanate monomer is a di-isocyanate monomer.

In an embodiment, the isocyanate monomer is a multi-functional isocyanate monomer with at least two isocyanate groups, or at least three isocyanate groups.

The isocyanate monomer may comprise two or more embodiments disclosed herein.

Polyol

The isocyanate prepolymer is the reaction product of an isocyanate monomer and at least one polyol. The polyol is selected from a polyester polyol, a polyether polyol, and combinations thereof.

The polyester polyol and the polyether polyol may be any respective polyester polyol and polyether polyol disclosed herein.

The polyol used to form the isocyanate prepolymer may be the same or different than the polyol included in the isocyanate component.

In an embodiment, the polyol used to form the isocyanate prepolymer is the same as the polyol included in the isocyanate component.

In an embodiment, the polyol used to form the isocyanate prepolymer is compositionally, structurally, or physically different than the polyol included in the isocyanate component.

In an embodiment, the polyol includes a polyester polyol and a polyether polyol.

The polyol may comprise two or more embodiments disclosed herein.

Optional Catalyst

In an embodiment, the isocyanate prepolymer is the reaction product of an isocyanate monomer, at least one polyol, and an optional catalyst.

Nonlimiting examples of suitable catalysts include dibutyltin dilaurate, zinc acetate, 2, 2-dimorpholinodiethylether, and combinations thereof.

In an embodiment, the isocyanate prepolymer is formed from the reaction product of an isocyanate composition containing from 10 wt %, or 20 wt %, or 30 wt % to 65 wt %, or 70 wt %, or 80 wt % isocyanate monomer, based on the total weight of the isocyanate composition.

In an embodiment, the isocyanate prepolymer is formed from the reaction product of an isocyanate composition containing from 2 wt %, or 5 wt %, or 8 wt % to 35 wt %, or 40 wt %, or 45 wt % polyester polyol, based on the total weight of the isocyanate composition.

In an embodiment, the isocyanate prepolymer is formed from the reaction product of an isocyanate composition containing from 5 wt %, or 10 wt %, or 15 wt % to 35 wt %, or 40 wt %, or 45 wt % polyether polyol, based on the total weight of the isocyanate composition.

In an embodiment, the isocyanate prepolymer is formed from the reaction product of an isocyanate composition containing, consisting essentially of, or consisting of: (i) from 10 wt %, or 20 wt %, or 30 wt % to 65 wt %, or 70 wt %, or 80 wt % isocyanate monomer; (ii) from 2 wt %, or 5 wt %, or 8 wt % to 35 wt %, or 40 wt %, or 45 wt % polyester polyol; and (iii) from 5 wt %, or 10 wt %, or 15 wt % to 35 wt %, or 40 wt %, or 45 wt % polyether polyol; and (iv) optionally, a catalyst.

In an embodiment, the isocyanate prepolymer is formed from the reaction product of an isocyanate composition containing, consisting essentially of, or consisting of: (i) a di-isocyanate aromatic monomer, (ii) a polyester polyol, and (iii) a polyether polyol.

In an embodiment, the isocyanate component, or further the isocyanate prepolymer, has an isocyanate (NCO) content by weight from 3 wt %, or 5 wt %, or 7 wt %, 10 wt %, or 12 wt % or 15 wt % to 17 wt %, or 20 wt %, or 22 wt %, or 25 wt %, or 30 wt %, 40 wt % or 50 wt %. In a further embodiment, the isocyanate component, or further the isocyanate prepolymer, has an NCO content by weight from 3 wt % to 50 wt %, or from 5 wt % to 25 wt %, or from 10 wt % to 20 wt %, or from 12 wt % to 17 wt %.

In an embodiment, the isocyanate component, or further the isocyanate prepolymer, has a viscosity at 25° C. from 300 cP, or 500 cP to 8,000 cP, or 10,000 cP, or 15,000 cP, or 20,000 cP. In a further embodiment, the isocyanate component, or further the isocyanate prepolymer, has a viscosity at 25° C. from 300 cP to 20,000 cP, or from 300 cP to 10,000 cP, or from 300 cP to 8,000 cP.

In an embodiment, the isocyanate component, or further the isocyanate prepolymer, has (i) an NCO content by weight from 3 wt %, or 5 wt %, or 7 wt %, 10 wt %, or 12 wt % or 15 wt % to 17 wt %, or 20 wt %, or 22 wt %, or 25 wt %, or 30 wt %, 40 wt % or 50 wt %; and (ii) a viscosity at 25° C. from 300 cP, or 500 cP to 8,000 cP, or 10,000 cP, or 15,000 cP, or 20,000 cP.

In an embodiment, the isocyanate prepolymer is formed from the reaction product of an isocyanate composition containing, consisting essentially of, or consisting of: (i) a di-isocyanate aromatic monomer; (ii) a polyester polyol; (iii) a polyether polyol; and the isocyanate component, or further the isocyanate prepolymer, has one or both of the following properties: (a) an NCO content from 12 wt % to 17 wt %; and/or (b) a viscosity at 25° C. from 300 cP to 8,000 cP.

A nonlimiting example of a suitable isocyanate prepolymer is the isocyanate prepolymer disclosed in International Publication No. WO 2018/049672, the entire contents of which are incorporated herein.

The isocyanate prepolymer may comprise two or more embodiments disclosed herein.

The isocyanate component may comprise two or more embodiments disclosed herein.

In an embodiment, the weight ratio of the isocyanate component to the polyol component in the solvent-less adhesive is from 0.4:1, or 1:1, or 1.5:1, or 1.8:1 to 4:1, or 4.5:1, or 5:1. In a further embodiment, the weight ratio of the isocyanate component to the polyol component in the solvent-less adhesive is from 0.4:1 to 5:1, or from 0.4:1 to 1:1, or from 0.4:1 to 0.9:1, or from 0.4:1 to 0.5:1.

The isocyanate component and the polyol component of the solvent-less adhesive can be formed separately and, if desired, stored until it is desired to use the solvent-less adhesive. When it is desired to use the solvent-less adhesive, the isocyanate component and the polyol component are brought into contact with each other and mixed together. When the polyol component and the isocyanate component are brought into contact with each other, a curing reaction begins in which the isocyanate groups react with the hydroxyl groups to form urethane links. The adhesive composition formed by bringing the two components into contact can be referred to as a "curable composition."

In an embodiment, the isocyanate component and the polyol component each is a liquid at 25° C.

In an embodiment, the polyol component is a solid at 25° C. The polyol component that is solid at 25° C. is heated to a molten state when it is brought into contact with the isocyanate component.

In an embodiment, the isocyanate component is heated to and maintained at a temperature from 30° C., or 35° C., or 40° C. to 45° C., or 50° C., or 55° C.; the polyol component is heated to and maintained at a temperature from 30° C., or 35° C. to 40° C., or 45° C., or 50° C., or 55° C.; and the isocyanate component and the polyol component are brought into contact with each other and mixed.

A nonlimiting example of a suitable method of forming the solvent-less adhesive is the method disclosed in International Publication No. WO 2018/049672, the entire contents of which are incorporated herein.

In an embodiment, the solvent-less adhesive is formed by bringing the polyol component and the isocyanate component into contact with each other to form a curable composition, and mixing the curable composition in a mixer, such as a Nordmeccanica mixer. The mixed curable composition is then transferred to a laminator via a hose pipe. In an embodiment, the hose pipe is maintained at a temperature from 30° C., or 35° C. to 40° C., or 45° C., or 50° C., or 55° C.

The solvent-less adhesive is applied between each film layer. Nonlimiting examples of suitable application methods include brushing, pouring, spraying, coating, rolling, spreading, and injecting.

In an embodiment, the solvent-less adhesive is applied between each film layer in a laminator. Nonlimiting examples of suitable laminators include non-mechanical super simplex laminators, such as a Nordmeccanica Super Combi 3000 laminator; and 1-shot non-mechanical laminators. In an embodiment, the laminator is a non-mechanical super simplex laminator. A non-mechanical super simplex laminator applies a pre-mixed solvent-less adhesive between film layers by (i) metering of each component (the polyol component and the isocyanate component), (ii) mixing the polyol component and the isocyanate component, and (iii) dispensing the mixture between film layers. In another embodiment, the laminator is a 1-shot non-mechanical laminator. A 1-shot non-mechanical laminator (i) applies the isocyanate component of the solvent-less adhesive to the surface of a first film layer, (ii) applies the polyol component of the solvent-less adhesive to the surface of a second film layer, and (iii) then brings the components into contact with each other to form a laminate. In a 1-shot non-mechanical laminator, the polyol component and the isocyanate component are not pre-mixed before each is applied to a film.

In an embodiment, the laminator is equipped with a plurality of steel rollers, or from 2, or 3, or 4 to 5, or 6, or 8 steel rollers. In an embodiment, the laminator is equipped with 4 steel rollers. The steel rollers are each maintained at a temperature from 35° C., or 40° C., or 45° C. to 50° C., or 55° C., or 60° C. In an embodiment, the laminator is equipped with four steel rollers, three of which are maintained at a temperature of 45° C., and one that is maintained at a temperature of 50° C.

A nonlimiting example of a suitable method of applying the solvent-less adhesive between each film layer in a laminator is the method described in U.S. Pat. No. 7,942,181, the entire contents of which are incorporated herein.

The solvent-less adhesive is applied at a coat weight from 2.0 g/m$^2$, or 2.5 g/m$^2$ to 2.8 g/m$^2$, or 3.5 g/m$^2$. In an embodiment, the solvent-less adhesive is applied at a coat weight from 2.0 g/m$^2$ to 3.5 g/m$^2$, or from 2.5 g/m$^2$ to 3.5 g/m$^2$, or from 2.5 g/m$^2$ to 2.8 g/m$^2$. Not wishing to be bound by any particular theory, it is believed that the use of a solvent-less adhesive enables a lower coat weight of from 2.0 g/m$^2$ to 3.5 g/m$^2$ compared to conventional solvent-based adhesives due to the absence of solvent in the solvent-less adhesive. A lower coat weight is advantageous to reduce costs, to reduce the weight of the adhesive applied to the film layers, and to reduce the weight of the laminate.

The solvent-less adhesive is applied between each film layer of pearlized BOPP.

The applying the solvent-less adhesive may comprise two or more embodiments disclosed herein.

C. Forming a Laminate

The process includes the step of forming a laminate. The laminate has a thickness of at least 300 μm.

After the solvent-less adhesive is applied at a temperature from 30° C. to 50° C., the structure containing at least 6 film layers and the solvent-less adhesive is stabilized to room temperature, i.e. from 20° C. to 50° C. The solvent-less adhesive cures to form adhesive layers between each film layer.

In an embodiment, the process includes curing the laminate at a temperature from 20° C. to 25° C., or 30° C., or 40° C., or 50° C. for a period of from 4 hours, or 5 hours, or 6 hours, or 7 hours to 8 hours, or 9 hours, or 10 hours, or 12 hours, or less than 24 hours, or 24 hours. In another embodiment, the process includes curing the laminate at a temperature from 20° C. to 50° C. for a period of from 4 hours, or 5 hours, or 6 hours, or 7 hours to 8 hours, or 9 hours, or 10 hours, or 12 hours, or less than 24 hours, or 24 hours.

In an embodiment, the laminate including at least 6 layers is formed simultaneously, with no intermediate curing. In other words, the laminator applies the solvent-less adhesive between each of the film layers, and the solvent-less adhesive between each film layer cures simultaneously at a temperature from 20° C. to 50° C. for a period of from 4 hours, or 5 hours, or 6 hours, or 7 hours to 8 hours, or 9 hours, or 10 hours, or 12 hours, or less than 24 hours, or 24 hours to form an adhesive layer between each film layer.

In an embodiment, the laminate is formed by forming a first intermediate with at least 1 film layer and a second intermediate with at least 2 film layers, and forming the laminate including the first intermediate structure and the second intermediate structure, with the proviso that the laminate includes at least 6 film layers. For example, the first intermediate includes 1 film layer and the second intermediate includes 5 film layers. The solvent-less adhesive is applied between each film layer of the second intermediate. After the solvent-less adhesive is applied between each film layer of the second intermediate, the solvent-less adhesive is applied between the first intermediate and the second intermediate to form a laminate with 6 film layers. The laminate is cured at a temperature from 20° C. to 50° C. The laminate is cured for a period of from 4 hours, or 5 hours, or 6 hours, or 7 hours to 8 hours, or 9 hours, or 10 hours, or 12 hours, or less than 24 hours, or 24 hours.

In another example, the first intermediate includes 2 film layers and the second intermediate includes 6 film layers. After the solvent-less adhesive is applied between each film layer of the first intermediate and the second intermediate, the solvent-less adhesive is applied between the first intermediate and the second intermediate to form a laminate with 8 film layers. The laminate is cured at a temperature from 20° C. to 50° C. In an embodiment, the first intermediate and the second intermediate are cured at a temperature from 20° C. to 50° C. before the solvent-less adhesive is applied between the first intermediate and the second intermediate. In another embodiment, the first intermediate and the second intermediate are not cured before the solvent-less adhesive is applied between the first intermediate and the second intermediate.

In another example, the first intermediate includes 4 film layers and the second intermediate includes 6 film layers. After the solvent-less adhesive is applied between each film layer of the first intermediate and the second intermediate, the solvent-less adhesive is applied between the first intermediate and the second intermediate to form a laminate with 10 film layers. The laminate is cured at a temperature from 20° C. to 50° C. In an embodiment, the first intermediate and the second intermediate are cured at a temperature from 20° C. to 50° C. before the solvent-less adhesive is applied between the first intermediate and the second intermediate. In another embodiment, the first intermediate and the second intermediate are not cured before the solvent-less adhesive is applied between the first intermediate and the second intermediate.

The laminate includes alternating film layers and adhesive layers. In other words, a laminate with 6 film layers has the following layer arrangement: pearlized BOPP film layer/ adhesive layer/pearlized BOPP film layer/adhesive layer/ pearlized BOPP film layer/adhesive layer/pearlized BOPP film layer/adhesive layer/pearlized BOPP film layer/adhesive layer/pearlized BOPP film layer.

The laminate includes at least 11 total layers, total layers including the film layers and the adhesive layers. In an embodiment, the laminate includes from 11, or 12, or 13, or 14, or 15 to 19, or 20, or 21, or 22, or 23 total layers.

Each adhesive layer directly contacts two film layers. Each film layer directly contacts at least one adhesive layer, or from 1 to 2 adhesive layers. In other words, the adhesive layers and film layers alternate and are in direct contact with each other. The term "directly contacts," as used herein, is a layer configuration whereby a film layer is located immediately adjacent to an adhesive layer and no intervening layers, or no intervening structures, are present between the film layer and the adhesive layer.

In an embodiment, the laminate is formed at a machine speed of at least 400 meters per minute (mpm). In another embodiment, the laminate is formed at a machine speed of from 400 mpm to 500 mpm, or 600 mpm, or 700 mpm, or 800 mpm, or 900 mpm, or 1,000 mpm. Not wishing to be bound by any particular theory, it is believed that the solvent-less adhesive enables laminates to be formed at machine speeds of at least 400 mpm because the speed of production is not hindered by the time needed to dry the solvent.

In an embodiment, the laminate is dried at a temperature from 20° C. to 50° C. Formation of the laminate that is dried at a room temperature (20-50° C.) excludes passing the film layers and solvent-less adhesive layers through an oven after the solvent-less adhesive is applied between the film layers.

The laminate has a thickness of at least 300 μm. In an embodiment, the laminate has a thickness from 300 μm, or 350 μm, or 400 μm to 500 μm, or 550 μm, or 600 μm, or 650 μm, or 700 μm. In another embodiment, the laminate has a thickness from 300 μm to 700 μm, or from 400 μm to 700 μm, or from 420 μm to 700 μm.

In an embodiment, the laminate has a bond strength at 24 hours from 300 g/15 mm, or 350 g/15 mm, or 390 g/15 mm, or 400 g/15 mm, or 450 g/15 mm, or 500 g/15 mm, or 540 g/15 mm, or 580 g/15 mm to 610 g/15 mm, or 650 g/15 mm, or 700 g/15 mm, or 900 g/15 mm. A bond strength at 24 hours from 300 g/15 mm to 900 g/15 mm indicates that the adhesive layer provides sufficient adhesion between the film layers to hold the film layers together and prevent defects in the laminate structure, such as telescoping, tunneling, and air gaps.

Not wishing to be bound by any particular theory, it is believed that the absence of a solvent in the solvent-less adhesive enables laminates to achieve a bond strength of at least 300 g/15 mm, or at least 350 g/10 mm, or at least 540 g/15 mm at 24 hours after applying the solvent-less adhesive. Conventional laminates formed with solvent-based adhesives require an oven drying step that delays the cure of the solvent-based adhesive, which results in a bond strength of less than 300 g/15 mm at 24 hours after applying the solvent-based adhesive.

In an embodiment, the laminate has a tear force in the machine direction (MD) from 100 milliNewtons (mN), or 500 mN, or 1,000 mN, or 1,500 mN, or 2,000 mN, or 2,500 mN, or 3,000 mN, or 3,500 mN, or 4,000 mN to 4,500 mN, or 5,000 mN. A low MD tear force of 100 mN to 5,000 mN indicates an easy tear, which in turn indicates that the laminate is acting as a single material/substrate despite being formed from multiple layers.

In an embodiment, the laminate has a tear force in the transverse direction (TD) from 100 mN, or 500 mN, or 1,000 mN, or 1,500 mN, or 2,000 mN, or 2,500 mN, or 3,000 mN, or 3,500 mN, or 4,000 mN, or 4,500 mN, or 5,000 mN, or 5,500 mN, or 6,000 mN, or 6,500 mN to 7,000 mN. A low TD tear force of 100 mN to 7,000 mN indicates an easy tear, which in turn indicates that the laminate is acting as a single material/substrate despite being formed from multiple layers.

In an embodiment, the laminate, after being placed on a flat surface, remains flat for a period of greater than 0 seconds (sec), or greater than 5 sec, or from 5 sec to 1 min, or 5 min, or 10 min. In other words, the laminate does not exhibit a curling effect.

In an embodiment, during a peel test, the laminate exhibits film tear. In other words, the failure during the peel test is in the film layer and not the adhesive layer.

The laminate has two opposing outermost surfaces. In an embodiment, at least one of the laminate's outermost surfaces is formed from a film layer surface having a matte finish. In another embodiment, each of the laminate's two outermost surfaces is formed from a film layer surface having a matte finish.

In an embodiment, the laminate has from 6, or 8 to 10 film layers, and the laminate has one, some, or all, of the following properties:
  (i) a thickness from 300 μm, or 350 μm, or 400 μm to 500 μm, or 550 μm, or 600 μm, or 650 μm, or 700 μm; and/or
  (ii) a bond strength at 24 hours from 300 g/15 mm, or 390 g/15 mm, or 400 g/15 mm, or 450 g/15 mm, or 500 g/15 mm, or 540 g/15 mm, or 580 g/15 mm to 610 g/15 mm, or 650 g/15 mm, or 700 g/15 mm, or 900 g/15 mm; and/or
  (iii) a tear force in the MD from 100 mN, or 500 mN, or 1,000 mN, or 1,500 mN, or 2,000 mN, or 2,500 mN, or 3,000 mN, or 3,500 mN, or 4,000 mN to 4,500 mN, or 5,000 mN; and/or
  (iv) a tear force in the TD from 100 mN, or 500 mN, or 1,000 mN, or 1,500 mN, or 2,000 mN, or 2,500 mN, or 3,000 mN, or 3,500 mN, or 4,000 mN, or 4,500 mN, or 5,000 mN, or 5,500 mN, or 6,000 mN, or 6,500 mN to 7,000 mN; and/or
  (v) exhibits film tear during a peel test.

In an embodiment, the forming the laminate includes one, some, or all, of the following parameters: (i) curing the laminate at a temperature from 20° C. to 50° C. for a period of from 4 hours, or 5 hours, or 6 hours, or 7 hours to 8 hours, or 9 hours, or 10 hours, or 12 hours, or less than 24 hours, or 24 hours; and/or (ii) forming the laminate at a machine speed of from 400 mpm to 500 mpm, or 600 mpm, or 700 mpm, or 800 mpm, or 900 mpm, or 1,000 mpm; and/or (iii) excluding passing the film layers and solvent-less adhesive through an oven after the solvent-less adhesive is applied between the film layers.

The forming the laminate step may comprise two or more embodiments disclosed herein.

In an embodiment, the process includes, consists essentially of, or consists of:
  (A) providing at least 6, or at least 8 film layers, each film layer being a pearlized BOPP having one, some, or all of the following properties:
    (i) a thickness from 50 μm to 70 μm, or 80 μm; and/or
    (ii) a width from 1000 mm, or 1200 mm, or 1400 mm, or 1500 mm, or 1600 mm, or 1700 mm to 1800 mm, or 1900 mm, or 2000 mm, or 2100 mm, or 2200 mm, or 2500 mm, or 3000 mm; and/or
(iii) has two opposing surfaces including a first surface having a matte finish and a second surface having a glossy finish; and/or
(iv) is void of EVA copolymer; and/or
(v) is void of PET;
(B) applying a solvent-less adhesive at a coat weight from 2.0 g/m², or 2.5 g/m² to 3.5 g/m² between each film layer, the solvent-less adhesive containing, consisting essentially of, or consisting of:
(i) a polyol component containing, consisting essentially of, or consisting of, at least one polyol selected from a polyester polyol, a polyether polyol, and combinations thereof;
(ii) an isocyanate component containing, consisting essentially of, or consisting of, an isocyanate prepolymer that is the reaction product of at least one isocyanate monomer and at least one polyol selected from a polyester polyol, a polyether polyol, and combinations thereof; and
(C) forming a laminate, the laminate having a thickness of at least 300 μm.

In an embodiment, the process includes, consists essentially of, or consists of:
(A) providing from 6, or 8 to 10, or 12 film layers, each film layer being a pearlized BOPP having one, some, or all of the following properties:
(i) a thickness from 50 μm to 70 μm, or 80 μm; and/or
(ii) a width from 1200 mm, or 1400 mm, or 1500 mm, or 1600 mm, or 1700 mm to 1800 mm, or 1900 mm, or 2000 mm, or 2100 mm, or 2200 mm, or 2500 mm; and/or
(iii) has two opposing surfaces including a first surface having a matte finish and a second surface having a glossy finish; and/or
(iv) is void of EVA copolymer; and/or
(v) is void of PET;
(B) applying a solvent-less adhesive at a coat weight from 2.0 g/m², or 2.5 g/m² to 3.5 g/m² between each film layer, the solvent-less adhesive containing, consisting essentially of, or consisting of:
(i) a polyol component containing, consisting essentially of, or consisting of:
(a) from 50 wt % to 80 wt % polyether polyol having a hydroxyl group functionality from 2 to 3 and a molecular weight from 50 g/mol to 1,000 g/mol; and
(b) from 10 wt % to 40 wt % polyester polyol that is the reaction product of adipic acid, TMP, DEG, isophthalic acid, and NPG, the polyester polyol having a hydroxyl group functionality of from 2 to 3 and a molecular weight from 500 g/mol to 2,000 g/mol;
(ii) an isocyanate component containing, consisting essentially of, or consisting of: (a) a di-isocyanate aromatic monomer; (b) a polyester polyol; (c) a polyether polyol; and the isocyanate component, or further the isocyanate prepolymer, has one or both of the following properties: (1) an NCO content from 12 wt % to 17 wt %; and/or (2) a viscosity at 25° C. from 300 cP to 8,000 cP; and
(C) forming a laminate, the laminate having from 8 to 10 film layers, and one, some, or all of the following properties:
(1) a thickness from 300 μm, or 350 μm, or 400 μm to 500 μm, or 550 μm, or 600 μm, or 650 μm, or 700 μm; and/or
(2) a bond strength at 24 hours from 300 g/15 mm, or 350 g/15 mm, or 390 g/15 mm, or 400 g/15 mm, or 450 g/15 mm, or 500 g/15 mm, or 540 g/15 mm, or 580 g/15 mm to 610 g/15 mm, or 650 g/15 mm, or 700 g/15 mm, or 900 g/15 mm; and/or
(3) a tear force in the MD from 100 mN, or 500 mN, or 1,000 mN, or 1,500 mN, or 2,000 mN, or 2,500 mN, or 3,000 mN, or 3,500 mN, or 4,000 mN to 4,500 mN, or 5,000 mN; and/or
(4) a tear force in the TD from 100 mN, or 500 mN, or 1,000 mN, or 1,500 mN, or 2,000 mN, or 2,500 mN, or 3,000 mN, or 3,500 mN, or 4,000 mN, or 4,500 mN, or 5,000 mN, or 5,500 mN, or 6,000 mN, or 6,500 mN to 7,000 mN; and/or
(5) exhibits film tear during a peel test;
wherein the forming the laminate includes one, some, or all, of the following parameters:
(i) curing the laminate at a temperature from 20° C. to 50° C. for a period of from 4 hours, or 5 hours, or 6 hours, or 7 hours to 8 hours, or 9 hours, or 10 hours, or 12 hours, or less than 24 hours, or 24 hours; and/or
(ii) forming the laminate at a machine speed of from 400 mpm to 500 mpm, or 600 mpm, or 700 mpm, or 800 mpm, or 900 mpm, or 1,000 mpm; and/or
(iii) excluding passing the film layers and solvent-less adhesive through an oven after the solvent-less adhesive is applied between the film layers.

The process may comprise two or more embodiments disclosed herein.

The present disclosure also provides a laminate formed by the process disclosed herein.

D. Laminate

The present disclosure provides a laminate. The laminate includes at least 6 film layers, each film layer being a pearlized biaxially oriented polypropylene (BOPP); and an adhesive layer between each film layer. Each adhesive layer is formed from a solvent-less adhesive containing (i) a polyol component including at least one polyol selected from a polyester polyol, a polyether polyol, and combinations thereof; and (ii) an isocyanate component including an isocyanate prepolymer that is the reaction product of at least one isocyanate monomer and at least one polyol selected from a polyester polyol, a polyether polyol, and combinations thereof. The laminate has a thickness of at least 300 μm.

The film layers, pearlized BOPP, adhesive layer, solvent-less adhesive, polyol component, isocyanate component, and laminate may be any respective film layers, pearlized BOPP, adhesive layer, solvent-less adhesive, polyol component, isocyanate component, and laminate disclosed herein.

In an embodiment, the laminate contains, consists essentially of, or consists of:
(A) from 6, or 8 to 10 film layers, each film layer being a pearlized BOPP;
(B) an adhesive layer between each film layer, each adhesive layer formed from a solvent-less adhesive composition containing, consisting essentially of, or consisting of:
(i) a polyol component containing, consisting essentially of, or consisting of:
(a) from 50 wt % to 80 wt % polyether polyol having a hydroxyl group functionality from 2 to 3 and a molecular weight from 50 g/mol to 1,000 g/mol; and (b) from 10 wt % to 40 wt % polyester polyol that is the reaction product of adipic acid, TMP, DEG, isophthalic acid, and NPG, the polyester polyol having a hydroxyl group functionality of from 2 to 3 and a molecular weight from 500 g/mol to 2,000 g/mol;

(ii) an isocyanate component containing, consisting essentially of, or consisting of: (a) a di-isocyanate aromatic monomer; (b) a polyester polyol; (c) a polyether polyol; and the isocyanate component, or further the isocyanate prepolymer, has one or both of the following properties: (1) an NCO content from 12 wt % to 17 wt %; and/or (2) a viscosity at 25° C. from 300 cP to 8,000 cP;

the laminate has a thickness from 300 μm, or 350 μm, or 400 μm to 500 μm, or 550 μm, or 600 μm, or 650 μm, or 700 μm; and the laminate has one, some, or all, of the following properties:

(1) a bond strength at 24 hours from 300 g/15 mm, or 350 g/15 mm, or 390 g/15 mm, or 400 g/15 mm, or 450 g/15 mm, or 500 g/15 mm, or 540 g/15 mm, or 580 g/15 mm to 610 g/15 mm, or 650 g/15 mm, or 700 g/15 mm, or 900 g/15 mm; and/or (2) a tear force in the MD from 100 mN, or 500 mN, or 1,000 mN, or 1,500 mN, or 2,000 mN, or 2,500 mN, or 3,000 mN, or 3,500 mN, or 4,000 mN to 4,500 mN, or 5,000 mN; and/or (3) a tear force in the TD from 100 mN, or 500 mN, or 1,000 mN, or 1,500 mN, or 2,000 mN, or 2,500 mN, or 3,000 mN, or 3,500 mN, or 4,000 mN, or 4,500 mN, or 5,000 mN, or 5,500 mN, or 6,000 mN, or 6,500 mN to 7,000 mN; and/or (4) exhibits film tear during a peel test.

The laminate may comprise two or more embodiments disclosed herein.

The present disclosure also provides an article containing the laminate. Nonlimiting examples of suitable articles include billboards, wall panels, wall signs, maps, calendars, brochures, menu cards, flip charts, children's books, tags (such as garment tags and baggage tags), labels (such as glass bottle labels, food labels, and horticulture labels), posters, banners, backlit displays, front-lit displayers, identification cards, certificates, and signs.

In an embodiment, the article excludes food packaging. In a further embodiment, the laminate is not in contact with a comestible.

By way of example, and not limitation, some embodiments of the present disclosure will now be described in detail in the following Examples.

EXAMPLES

A. Forming Laminates with a Solvent-Less Adhesive

Laminates are prepared on a Nordmeccanica Super Combi 3000 laminator equipped with a Nordmeccanica mixer. The Nordmeccanica mixer is equipped with two tanks—one containing a polyol component (the "OH Tank") and one containing an isocyanate component (the "NCO Tank"). The polyol component includes (i) from 50 wt % to 80 wt % of a polyether polyol having a hydroxyl group functionality from 2 to 3 and a molecular weight from 50 g/mol to 1,000 g/mol; and (ii) from 10 wt % to 40 wt % of a polyester polyol that is the reaction product of adipic acid, trimethylpropane (TMP), diethylene glycol (DEG), isophthalic acid, and neopentyl glycol (NPG), the polyester polyol having a hydroxyl group functionality of from 2 to 3 and a molecular weight from 500 g/mol to 2,000 g/mol, based on the total weight of the polyol component. The isocyanate component includes an isocyanate prepolymer that is the reaction product of (i) a di-isocyanate aromatic monomer, (ii) a polyester polyol, and (iii) a polyether polyol, the isocyanate prepolymer having an NCO content from 12 wt % to 17 wt % and a viscosity at 25° C. from 300 cP to 8,000 cP. The OH Tank is maintained at a temperature of 30-45° C. The NCO Tank is maintained at a temperature of 35-50° C. The Nordmeccanica mixer mixes the Polyol Component and the Isocyanate Component at a ratio of 42-48 parts by weight of the Isocyanate Component per 100 parts Polyol Component. A hose pipe between the Nordmeccanica mixer and the solvent-less adhesive application site is maintained at 35-45° C.

The Nordmeccanica Super Combi 3000 laminator has four steel rollers. The first two steel rollers (S1 and S2) each maintained at 35-45° C. The third steel roller (S3) is maintained at 40-50° C. The fourth steel roller (S4) is maintained at 35-55° C. For each sample, the primary unwind is 110 Newtons (N), the bridge is 120 N, the secondary unwind is 95 N, and the rewind force if 180-200 N. For each sample, the transfer press is set at 4 bar, the coater press is set at 4 bar, the laminating nip press is set at 4 bar, and the lay-on press is set at 3 bar. For CS 1, CS 2, CS 3, Ex 18, Ex 20, Ex 22, and Ex 24, the machine speed is set at 200-400 meters per minute (mpm). For CS 4, CS 5, Ex 6, Ex 7, Ex. 8, and Ex. 9, the machine speed is set at 400 mpm. For each sample, the taper linear is 15-20%. The web width of each sample is 1,220 mm.

Each film layer is a pearlized BOPP containing polypropylene and titanium dioxide. The film layers have a thickness of 50 μm or 70 μm. Each film layer has a width of 650-1800 mm. Each film layer has two opposing surfaces, including a surface with a glossy finish and a surface with a matte finish. The solvent-less adhesive is applied between each film layer in the Nordmeccanica Super Combi 3000 laminator. A laminate is formed.

Each laminate sample has two opposing outer surfaces. Each outer surface is a matte surface from the pearlized BOPP Film. The matte outer surface enables printing on the laminate.

The solvent-less adhesive of each laminate sample is applied at a coat weight of from 2.0 g/m² to 3.5 g/m².

Comparative Sample 1 (CS 1) is formed from two pearlized BOPP Films, each film having a thickness of 50 μm.

Comparative Sample 2 (CS 2) is formed from two pearlized BOPP Films, each film having a thickness of 70 μm.

Comparative Sample 3 (CS 3) is formed from two pearlized BOPP Films, one film having a thickness of 50 μm and the other film having a thickness of 70 μm.

Comparative Sample 4 (CS 4) is formed from CS 1 and a pearlized BOPP Film having a thickness of 50 μm. CS 4 has a total of 3 film layers.

Comparative Sample 5 (CS 5) is formed from CS 2 and CS 3. CS 5 has a total of 4 film layers.

Example 6 (Ex. 6) is formed from CS 2 and CS 5. Ex. 6 has a total of 6 film layers.

Example 7 (Ex. 7) is formed from CS 3 and CS 5. Ex. 7 has a total of 6 film layers.

Example 8 (Ex. 8) is formed from CS 3 and CS 7. Ex. 8 has a total of 8 film layers.

Example 9 (Ex. 9) is formed from CS 5 and CS 7. Ex. 9 has a total of 10 film layers.

Example 18 (Ex. 18) is formed from (i) a first laminate containing 6 layers of pearlized BOPP Film, with 4 film layers having a thickness of 70 μm and 2 film layers having a thickness of 50 µm; and (ii) a pearlized BOPP Film having a thickness of 70 µm. Ex. 18 has a total of 7 film layers.

Example 20 (Ex. 20) is formed from (i) a first laminate containing 4 layers of pearlized BOPP Film, with 2 film layers having a thickness of 70 µm and 2 film layers having a thickness of 50 µm; and (ii) a second laminate containing 3 layers of pearlized BOPP Film, each film layer having a thickness of 70 µm. Ex. 20 has a total of 7 film layers.

Example 22 (Ex 22) is formed from (i) a first laminate containing 3 layers of pearlized BOPP Film, with 1 film layer having a thickness of 70 µm and 2 film layers having a thickness of 50 µm; and (ii) a second laminate containing 5 layers of pearlized BOPP Film, each having a thickness of 50 µm. Ex. 22 has a total of 8 film layers.

Example 24 (Ex. 24) is formed from (i) a first laminate containing 4 layers of pearlized BOPP Film, with 2 film layers having a thickness of 70 µm and 2 film layers having a thickness of 50 µm; and (ii) a second laminate containing 2 layers of pearlized BOPP Film, each film layer having a thickness of 70 µm. Ex. 24 has a total of 6 film layers.

Ex. 6-9, Ex. 18, Ex. 20, Ex. 22, and Ex. 24, after being placed on a flat surface, remains flat for a period of from 5 sec to 1 min. In other words, the laminates Ex. 6-9, Ex. 18, Ex. 20, Ex. 22, and Ex. 24 each does not exhibit a curling effect.

B. Forming Laminates with a Solvent-Based Adhesive

Comparative Samples 10-17, 19, 21, and 23 (CS 10-17, 19, 21, and 23) are formed using solvent-based adhesive LOCTITE™ CAC 2211/CAC 1511A, available from Henkel AG & Co. KGaA, which contains a polyester polyol dispersed in ethyl acetate solvent.

Laminates are prepared on a local solvent-based adhesive laminator. The solvent-based adhesive (LOCTITE™ CAC 2211/CAC 1511A), a hardener and additional solvent are mixed and diluted to a particular solid content (around 35 wt %). The diluted solvent-based adhesive is placed in the adhesive tray of the laminator. The solvent-based adhesive is applied on a film by the help of a gravure cylinder and doctor blade. The applied solvent-based adhesive is dried in the drying tunnel of the laminator, the drying tunnel maintained at a temperature greater than 50° C., and is then combined with a second film at the laminating nip.

Each laminate sample has two opposing outer surfaces. Each outer surface is a matte surface from the pearlized BOPP Film. The matte outer surface enables printing on the laminate.

Each laminate sample is cured at room temperature (23° C.).

The solvent-based adhesive is applied at a coat weight from 2.5 g/m² to 3.5 g/m².

Comparative Sample 10 (CS 10) is formed from two pearlized BOPP Films, each film having a thickness of 50 µm.

Comparative Sample 11 (CS 11) is formed from four pearlized BOPP Films, with one film layer having a thickness of 70 µm and the other film layers having a thickness of 50 µm.

Comparative Sample 12 (CS 12) is formed from four pearlized BOPP Films, with one film layer having a thickness of 50 µm and the other film layers having a thickness of 70 µm.

Comparative Sample 13 (CS 13) is formed from five pearlized BOPP Films, with one film layer having a thickness of 50 µm and the other film layers having a thickness of 70 µm.

Comparative Sample 14 (CS 14) is formed from six pearlized BOPP Films, with two film layers having a thickness of 50 µm and the other films having a thickness of 70 µm.

Comparative Sample 15 (CS 15) is formed from seven pearlized BOPP Films, with three film layers having a thickness of 50 µm and the other film layers having a thickness of 70 µm.

Comparative Sample 16 (CS 16) is formed from seven pearlized BOPP Films, with four film layers having a thickness of 70 µm and the other film layers having a thickness of 50 µm.

Comparative Sample 17 (CS 17) is formed from (i) a first laminate containing 6 layers of pearlized BOPP Film, with 4 film layers having a thickness of 70 µm and 2 film layers having a thickness of 50 µm; and (ii) a pearlized BOPP Film having a thickness of 70 µm. CS 17 has a total of 7 film layers.

Comparative Sample 19 (CS 19) is formed from (i) a first laminate containing 4 layers of pearlized BOPP Film, with 2 film layers having a thickness of 70 µm and 2 film layers having a thickness of 50 µm; and (ii) a second laminate containing 3 layers of pearlized BOPP Film, each film layers having a thickness of 70 µm. CS 19 has a total of 7 film layers.

Comparative Sample 21 (CS 21) is formed from (i) a first laminate containing 3 layers of pearlized BOPP Film, with 1 film layer having a thickness of 70 µm and 2 film layers having a thickness of 50 µm; and (ii) a second laminate containing 5 layers of pearlized BOPP Film, each film layer having a thickness of 50 µm. CS 21 has a total of 8 film layers.

Comparative Sample 23 (CS 23) is formed from (i) a first laminate containing 4 layers of pearlized BOPP Film, with 2 film layers having a thickness of 70 µm and 2 film layers having a thickness of 50 µm; and (ii) a second laminate containing 2 layers of pearlized BOPP Film, each film layer having a thickness of 70 µm. CS 23 has a total of 6 film layers.

The laminate structure of each Comparative Sample and Example is provided below in Table 1. In Table 1, "BOPP50" refers to pearlized BOPP Film having a thickness of 50 µm, "BOPP70" refers to pearlized BOPP Film having a thickness of 70 µm, "SL Adhesive" refers to the solventless adhesive, and "SB Adhesive" refers to the solvent-based adhesive. The "/" symbol denotes a film layer configuration in which the layers on either side of the "/" symbol are in direct contact with each other.

TABLE 1

| | |
|---|---|
| CS 1 | BOPP50/SL Adhesive/BOPP50 |
| CS 2 | BOPP70/SL Adhesive/BOPP70 |
| CS 3 | BOPP50/SL Adhesive/BOPP70 |
| CS 4 | BOPP50/SL Adhesive/BOPP50/SL Adhesive/BOPP50 |
| CS 5 | BOPP70/SL Adhesive/BOPP70/SL Adhesive/BOPP50/SL Adhesive/BOPP70 |
| Ex 6 | BOPP70/SL Adhesive/BOPP70/SL Adhesive/BOPP70/SL Adhesive/BOPP70/SL Adhesive/BOPP50/SL Adhesive/BOPP70 |
| Ex 7 | BOPP70/SL Adhesive/BOPP70/SL Adhesive/BOPP50/SL Adhesive/BOPP70/SL Adhesive/BOPP50/SL Adhesive/BOPP70 |
| Ex 8 | BOPP70/SL Adhesive/BOPP70/SL Adhesive/BOPP50/SL Adhesive/BOPP50/SL Adhesive/BOPP70/SL Adhesive/BOPP50/SL Adhesive/BOPP70 |
| Ex 9 | BOPP70/SL Adhesive/BOPP70/SL Adhesive/BOPP50/SL Adhesive/BOPP70/SL Adhesive/BOPP50/SL Adhesive/BOPP70/SL Adhesive/BOPP50/SL Adhesive/BOPP50/SL Adhesive/BOPP70 |
| CS 10 | BOPP50 /SB Adhesive/BOPP50 |
| CS | BOPP70/SB Adhesive/BOPP50/SB Adhesive/BOPP50/SB |

TABLE 1-continued

| | |
|---|---|
| 11 | Adhesive/BOPP50 |
| CS | BOPP70/SB Adhesive/BOPP70/SB Adhesive/BOPP50/SB |
| 12 | Adhesive/BOPP70 |
| CS | BOPP/SB Adhesive/BOPP70/SB Adhesive/BOPP50/SB |
| 13 | Adhesive/BOPP70/SB Adhesive/BOPP70 |
| CS | BOPP70/SB Adhesive/BOPP70/SB Adhesive/BOPP50/SB |
| 14 | Adhesive/BOPP70/SB Adhesive/BOPP50/SB Adhesive/BOPP70 |
| CS | BOPP/SB Adhesive/BOPP50/SB Adhesive/BOPP70/SB |
| 15 | Adhesive/BOPP50/SB Adhesive/BOPP70/SB Adhesive/BOPP50/SB Adhesive/BOPP70 |
| CS | BOPP70/SB Adhesive/BOPP50/SB Adhesive/BOPP70/SB |
| 16 | Adhesive/BOPP50/SB Adhesive/BOPP70/SB Adhesive/BOPP50/SB Adhesive/BOPP70 |
| CS | BOPP70/SB Adhesive/BOPP70/SB Adhesive/BOPP50/SB |
| 17 | Adhesive/BOPP70/SB Adhesive/BOPP50/SB Adhesive/BOPP70/SB Adhesive/BOPP70 |
| Ex | BOPP70/SL Adhesive/BOPP70/SL Adhesive/BOPP50/SL |
| 18 | Adhesive/BOPP70/SL Adhesive/BOPP50/SL Adhesive/BOPP70/SL Adhesive/BOPP70 |
| CS | BOPP50/SB Adhesive/BOPP50/SB Adhesive/BOPP70/SB |
| 19 | Adhesive/BOPP70/SB Adhesive/BOPP70/SB Adhesive/BOPP70/SB Adhesive/BOPP70 |
| Ex | BOPP50/SL Adhesive/BOPP50/SL Adhesive/BOPP70/SL |
| 20 | Adhesive/BOPP70/SL Adhesive/BOPP70/SL Adhesive/BOPP70/SL Adhesive/BOPP70 |
| CS | BOPP50/SB Adhesive/BOPP50/SB Adhesive/BOPP70/SB |
| 21 | Adhesive/BOPP50/SB Adhesive/BOPP50/SB Adhesive/BOPP50/SB Adhesive/BOPP50/SB Adhesive/BOPP50 |
| Ex. | BOPP50/SL Adhesive/BOPP50/SL Adhesive/BOPP70/SL |
| 22 | Adhesive/BOPP50/SL Adhesive/BOPP50/SL Adhesive/BOPP50/SL Adhesive/BOPP50/SL Adhesive/BOPP50 |
| CS | BOPP50/SB Adhesive/BOPP50/SB Adhesive/BOPP70/SB |
| 23 | Adhesive/BOPP70/SB Adhesive/BOPP70/SB Adhesive/BOPP70 |
| Ex | BOPP50/SL Adhesive/BOPP50/SL Adhesive/BOPP70/SL |
| 24 | Adhesive/BOPP70/SL Adhesive/BOPP70/SL Adhesive/BOPP70 |

The properties of each laminate sample is provided below in Table 2.

Applicant unexpectedly found that laminates having a thickness of at least 300 μm that contain at least 6 film layers of pearlized BOPP film, with a solvent-less adhesive applied at a coat weight of 2.0-3.5 g/m² between each film layer, the solvent-less adhesive containing (i) a polyol component including a polyol selected from a polyester and a polyether, and (ii) an isocyanate component including an isocyanate prepolymer that is the reaction product of an isocyanate monomer and a polyol selected from a polyester and a polyether (Ex. 6-9, Ex. 18, Ex. 20, Ex. 22, Ex. 24) advantageously exhibit (a) a bond strength at 24 hours of at least 300 g/15 mm, (b) a tear force in the MD of less than 5,000 mN, and (c) a tear force in the TD of less than 7,000 mN. Consequently, articles formed from the laminates of Ex. 6-7, Ex. 6-9, Ex. 18, Ex. 20, Ex. 22, Ex. 24 are suitable for article applications that require thick laminates, such as billboards and wall signs.

Applicant unexpectedly found that laminates having a thickness of at least 300 μm that contain at least 6 film layers of pearlized BOPP film, with a solvent-less adhesive applied at a coat weight of 2.0-3.5 g/m² between each film layer, the solvent-less adhesive containing (i) a polyol component including a polyether polyol, and a polyester polyol that is the reaction product of adipic acid, TMP, DEG, isophthalic acid, and NPG; and (ii) an isocyanate component including an isocyanate prepolymer that is the reaction product of a di-isocyanate aromatic monomer, a polyester polyol, and a polyether polyol (Ex. 6-9, Ex. 18, Ex. 20, Ex. 22, Ex. 24) advantageously exhibit (a) a bond strength at 24 hours of at least 300 g/15 mm, (b) a MD tear force of less than 5,000 mN, and (c) a TD tear force of less than 7,000 mN, which is comparable to, or an improvement over, conventional laminates formed with a solvent based adhesive (CS 14-23). Consequently, the present examples demonstrate that the

TABLE 2

| | Adhesive Type | No. of Film Layers | Total Laminate Thickness (μm) | Bond Strength @ 24 Hours (g/15 mm) | Peel Failure | Tear Force in MD (mN)[1] | Tear Force in TD (mN)[1] | Tear Force Distance (43 mm) |
|---|---|---|---|---|---|---|---|---|
| CS 1 | Solvent-Less | 2 | 100 | 150-180 | Initial Peel and Film Tear | 298.6 | 224.1 | 16000 |
| CS 2 | Solvent-Less | 2 | 140 | 450-480 | Film Tear | 521.8 | 373.1 | 32000 |
| CS 3 | Solvent-Less | 2 | 120 | 200-230 | Film Tear | 298.6 | 224.1 | 16000 |
| CS 4 | Solvent-Less | 3 | 150 | 490-530 | Film Tear | 560.5 | 448.6 | 16000 |
| CS 5 | Solvent-Less | 4 | 260 | 370-410 | Film Tear | 1193 | 1379 | 32000 |
| Ex 6 | Solvent-Less | 6 | 400 | 350-390 | Film Tear | 2266 | 3628 | 32000 |
| Ex 7 | Solvent-Less | 6 | 380 | 270-310 | Film Tear | 2229 | 3110 | 16000 |
| Ex 8 | Solvent-Less | 8 | 500 | 580-610 | Film Tear | 3329 | 4550 | 32000 |
| Ex 9 | Solvent-Less | 10 | 640 | 540-560 | Film Tear | 4455 | 6928 | 32000 |
| CS 10 | Solvent-Based | 2 | 95 | 160-200 | Initial Peel and Film Tear | 242.7 | 224.1 | 16000 |
| CS 11 | Solvent-Based | 4 | 215 | 330-370 | Film Tear | 818.2 | 688.7 | 16000 |
| CS 12 | Solvent-Based | 4 | 275 | 310-350 | Film Tear | 1193 | 1527 | 32000 |
| CS 13 | Solvent-Based | 5 | 330 | 310-360 | Film Tear | 1188 | 1626 | 32000 |
| CS 14 | Solvent-Based | 6 | 375 | 260-300 | Film Tear | 1681 | 2311 | 32000 |
| CS 15 | Solvent-Based | 7 | 430 | 270-310 | Film Tear | 2237 | 4450 | 16000 |
| CS 16 | Solvent-Based | 7 | 430 | 270-310 | Film Tear | 1829 | 2458 | 32000 |
| CS 17 | Solvent-Based | 7 | 450 | 310-340 | Film Tear | NM | NM | NM |
| Ex 18 | Solvent-Less | 7 | 450 | 580-610 | Film Tear | NM | NM | NM |
| CS 19 | Solvent-Based | 7 | 450 | 400-500 | Film Tear | NM | NM | NM |
| Ex 20 | Solvent-Less | 7 | 450 | 270-310 | Film Tear | NM | NM | NM |
| CS 21 | Solvent-Based | 8 | 420 | 150-270 | Film Tear | NM | NM | NM |
| Ex 22 | Solvent-Less | 8 | 420 | 350-390 | Film Tear | NM | NM | NM |
| CS 23 | Solvent-Based | 6 | 380 | 320-390 | Film Tear | NM | NM | NM |
| Ex 24 | Solvent-Less | 6 | 380 | 350-390 | Film Tear | NM | NM | NM |

[1]The average of 4 samples is reported.
"MD" refers to machine direction.
"TD" refers to transverse direction.
NM = not measured solvent-less adhesive containing (i) a polyol component including a polyol selected from a polyester and a polyether, and (ii) an isocyanate component including an isocyanate prepolymer that is the reaction product of an isocyanate monomer and a polyol selected from a polyester and a polyether, is a suitable replacement for conventional solvent-based adhesives in laminates having a thickness of at least 300 μm with at least 6 film layer of pearlized BOPP film. The present solvent-less adhesive provides the added advantage of not requiring oven drying for cure, which decreases the processing costs and speeds up production.

It is specifically intended that the present disclosure not be limited to the embodiments and illustrations contained herein, but include modified forms of those embodiments including portions of the embodiments and combinations of elements of different embodiments as come within the scope of the following claims.

The invention claimed is:

1. A laminate comprising:
  at least 6 film layers, each film layer being a pearlized biaxially oriented polypropylene (BOPP), with one of the BOPP film layers being an outermost layer on a first side of the laminate and another BOPP layer being an outermost layer on a second side opposing the first side;
  an adhesive layer between each film layer, each adhesive layer in direct contact with two film layers, each adhesive layer formed from a solvent-less adhesive comprising
    (i) a polyol component comprising at least one polyol selected from the group consisting of a polyester polyol, a polyether polyol, and combinations thereof;
    (ii) an isocyanate component comprising an isocyanate prepolymer that is the reaction product of at least one isocyanate monomer and at least one polyol selected from the group consisting of a polyester polyol, a polyether polyol, and combinations thereof; and
  the laminate has a thickness of at least 300 μm.

2. The laminate of claim 1, wherein each film layer has a thickness from 50 μm to 80 μm.

3. The laminate of claim 1, wherein the solvent-less adhesive comprises
  (i) the polyol component comprising the polyester polyol and the polyether polyol; and
  (ii) the isocyanate component comprising the isocyanate prepolymer that is the reaction product of a di-isocyanate monomer, a polyester polyol, and a polyether polyol.

4. The laminate of claim 1 wherein the laminate consists of the film layers and the adhesive layers.

5. A laminate comprising:
  at least 6 film layers, each film layer being a pearlized biaxially oriented polypropylene (BOPP), each film layer having a thickness from 50 μm to 80 μm, with one of the BOPP film layers being an outermost layer on a first side of the laminate and another BOPP layer being an outermost layer on a second side opposing the first side;
  an adhesive layer between each film layer, each adhesive layer in direct contact with two film layers, each adhesive layer formed from a solvent-less adhesive comprising
    (i) a polyol component comprising at least one polyol selected from the group consisting of a polyester polyol, a polyether polyol, and combinations thereof;
    (ii) an isocyanate component comprising an isocyanate prepolymer that is the reaction product of at least one isocyanate monomer and at least one polyol selected from the group consisting of a polyester polyol, a polyether polyol, and combinations thereof; and
  the laminate has a thickness of at least 300 μm.

6. The laminate of claim 5 wherein the laminate consists of the film layers and the adhesive layers.

7. A process comprising:
  (A) providing at least 6 film layers, each film layer being a pearlized biaxially oriented polypropylene (BOPP) with one of the BOPP film layers being an outermost layer on a first side of the laminate and another BOPP layer being an outermost layer on a second side opposing the first side;
  (B) applying a solvent-less adhesive at a coat weight from 2.0 g/m² to 3.5 g/m² between each film layer such that the solvent-less adhesive is in direct contact with two film layers, the solventless adhesive comprising
    (i) a polyol component comprising at least one polyol selected from the group consisting of a polyester polyol, a polyether polyol, and combinations thereof;
    (ii) an isocyanate component comprising an isocyanate prepolymer that is the reaction product of at least one isocyanate monomer and at least one polyol selected from the group consisting of a polyester polyol, a polyether polyol, and combinations thereof; and
  (C) forming a laminate, the laminate having a thickness of at least 300 μm.

8. The process of claim 7 wherein the forming the laminate comprises forming the laminate having a bond strength at 24 hours from 300 g/15 mm to 900 g/15 mm.

9. The process of claim 7 wherein the forming the laminate comprises forming the laminate having a tear force in the machine direction from 100 mN to 5,000 mN.

10. The process of claim 7 comprising providing at least 6 film layers, each film layer being a pearlized BOPP having a thickness from 50 μm to 80 μm.

11. The process of claim 7 comprising applying a solvent-less adhesive comprising
  (i) the polyol component comprising the polyester polyol and the polyether polyol; and
  (ii) the isocyanate component comprising the isocyanate prepolymer that is the reaction product of a di-isocyanate monomer, a polyester polyol, and a polyether polyol.

12. The process of claim 7 comprising applying a solvent-less adhesive comprising
  (i) the polyol component comprising the polyester polyol that is the reaction product of adipic acid, isophthalic acid, diethylene glycol (DEG), trimethylolpropane (TMP), and neopentyl glycol (NPG); and
  (ii) the isocyanate component.

13. The process of claim 7 comprising forming the laminate at a machine speed of at least 400 mpm.

14. The process of claim 7 comprising forming the laminate comprising the at least 6 film layers simultaneously, with no intermediate curing.

15. The process of claim 7 wherein forming the laminate comprises:
  forming a first intermediate structure comprising at least one film layer;
  forming a second intermediate structure comprising at least two film layers; and
  forming the laminate comprising the first intermediate structure and the second intermediate structure, with the proviso that the laminate comprises at least six film layers.

16. The process of claim 7, comprising drying the laminate at a temperature from 20° C. to 50° C.

17. The process of claim 7 comprising curing the laminate at a temperature from 20° C. to 50° C.

18. A laminate formed by the process of claim 7.

* * * * *